(12) United States Patent
Chang et al.

(10) Patent No.: US 6,929,684 B2
(45) Date of Patent: Aug. 16, 2005

(54) AIR CLEANING APPARATUS

(75) Inventors: Jun Eui Chang, Suwon (KR); Kyung Ho Chai, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 128 days.

(21) Appl. No.: 10/673,197

(22) Filed: Sep. 30, 2003

(65) Prior Publication Data

US 2004/0118289 A1 Jun. 24, 2004

(30) Foreign Application Priority Data

Dec. 23, 2002 (KR) ................................ 10-2002-0082704

(51) Int. Cl.$^7$ ............................................... B01D 35/30
(52) U.S. Cl. ........................... 96/226; 96/397; 96/417; 96/423; 55/471; 55/472; 55/485; 55/486
(58) Field of Search ...................... 55/471, 472, 467, 55/486, 485, 309; 96/226, 417, 397, 423; 95/8

(56) References Cited

U.S. PATENT DOCUMENTS 3,518,046 A * 6/1970 Cicirello ...................... 96/224
5,934,991 A * 8/1999 Rush ........................... 454/187
6,361,590 B1   3/2002 Gilbert, Jr. et al.

* cited by examiner

Primary Examiner—Robert A. Hopkins
(74) Attorney, Agent, or Firm—Staas & Halsey LLP

(57) ABSTRACT

An air cleaning apparatus includes an air cleaning unit moved in a vertical direction to clean room air, allowing the room air to be effectively and uniformly cleaned in a short period of time. The air cleaning apparatus includes a longitudinal cabinet to stand on a support surface. An air cleaning unit is installed in the cabinet to move in the vertical direction, and is provided with a blowing unit and a filtering unit to clean air. An elevating unit is provided at at least one of the cabinet and the air cleaning unit to move the air cleaning unit in the vertical direction. The air cleaning apparatus also includes upper and lower sensors, and a control unit. The upper and lower sensors are provided on upper and lower portions of the cabinet, respectively, to sense air pollution levels of upper and lower parts of a room. The control unit controls the air cleaning unit so that the air cleaning unit moves upward or downward, according to data obtained from the upper and lower sensors.

16 Claims, 6 Drawing Sheets

AIR CLEANING APPARATUS

CROSS-REFERENCE TO RELATED APPLICATION

This application claims the benefit of Korean Application No. 2002-82704, filed Dec. 23, 2002, in the Korean Intellectual Property Office, the disclosure of which is incorporated herein by reference.

BACKGROUND OF THE INVENTION

1. Field of the Invention

The present invention relates, in general, to air cleaning apparatuses and, more particularly, to an air cleaning apparatus, which is designed such that an air cleaning unit is moved up and down to clean room air.

2. Description of the Related Art

As is well known to those skilled in the art, an air cleaning apparatus is an appliance which removes dust or bacteria from air to clean the air. The air cleaning apparatus is provided with a blowing unit and a filtering unit. The blowing unit functions to suck room air and forcibly circulate the air. The filtering unit functions to remove dust or bacteria from the air which is circulated by the blowing unit.

The air cleaning apparatus includes a cabinet which defines an external appearance of the air cleaning apparatus. The blowing unit includes a blowing fan provided in the cabinet, and a motor to drive the blowing fan. The filtering unit is provided at an air inlet side or an air outlet side of the blowing unit, and includes a free filter of a net structure with relatively large meshes, a fine dust filter which is made of polypropylene resin or polyethylene resin to have a shape of non-woven fabric, etc. In this case, the filters are arranged to be superposed. The air cleaning apparatus described above is operated as follows.

While the room air is circulated by an operation of the blowing unit, the air passes through the filtering unit. At this time, impurities, such as the dust, are removed from the air to clean the room air.

The air cleaning apparatus is installed at a position inside a room to clean the room air. When the conventional air cleaning apparatus is operated to clean the room air, the room air around the air cleaning apparatus is smoothly circulated, thus accomplishing an excellent air cleaning effect. However, an air cleaning effect is relatively poor in areas which are distant from the air cleaning apparatus, so it takes a considerably long time to uniformly and completely clean the room air.

SUMMARY OF THE INVENTION

Accordingly, it is an aspect of the present invention to provide an air cleaning apparatus which is designed such that an air cleaning unit is moved up and down to clean room air, thus allowing room air to be uniformly and effectively cleaned in a short period of time.

Additional aspects and advantages of the invention will be set forth in part in the description which follows and, in part, will be obvious from the description, or may be learned by practice of the invention.

The foregoing and/or other aspects of the present invention are achieved by providing an air cleaning apparatus, including a longitudinal cabinet to stand on a support surface, an air cleaning unit installed in the cabinet to move in a vertical direction and provided with a blowing unit and a filtering unit to clean air, and an elevating unit provided at at least one of the cabinet and the air cleaning unit to move the air cleaning unit in the vertical direction.

According to an aspect of the invention, the air cleaning apparatus includes upper and lower sensors which are provided on upper and lower portions of the cabinet, respectively, to sense air pollution levels of upper and lower parts of a room, and a control unit to control the air cleaning unit so that the air cleaning unit moves upward or downward, according to data obtained from the upper and lower sensors.

According to an aspect of the invention, the cabinet has a cylindrical shape with vertical openings at opposite sides of the cabinet to circulate room air. The air cleaning unit includes a casing having a cylindrical shape which has an outer diameter corresponding to an inner diameter of the cabinet so that the air cleaning unit moves in the cabinet in a vertical direction. An air inlet port and an air outlet port are provided on the casing at positions to correspond to the vertical openings so that the air inlet port communicates with the air outlet port. The blowing unit and filtering unit are installed in the casing.

According to an aspect of the invention, the blowing unit includes a cross-flow blowing fan longitudinally installed in the casing of the air cleaning unit, and a fan motor installed in the casing to rotate the blowing fan.

According to an aspect of the invention, the filtering unit includes a filter casing removably mounted to the air inlet port of the casing, and at least one filter installed in the filter casing.

According to another aspect of the invention, the filter, installed in the filter casing, includes an antibacterial free filter, an electrostatic dust filter, and a fine dust filter which are arranged to be superposed.

According to an aspect of the invention, the elevating unit includes a rack longitudinally provided at an inner surface of the cabinet, a guide channel longitudinally provided at an outer surface of the casing to receive the rack, guiding an elevating movement of the casing. The elevating unit also includes a pinion to engage with the rack and rotatably supported by the casing, and a motor provided at the casing to rotate the pinion clockwise or counterclockwise.

According to yet another aspect of the invention, the air cleaning apparatus includes a control panel mounted to a top of the cabinet, and provided with a plurality of control buttons to control an operation of the air cleaning apparatus and a display to display an operating state of the air cleaning apparatus.

BRIEF DESCRIPTION OF THE DRAWINGS

The above and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
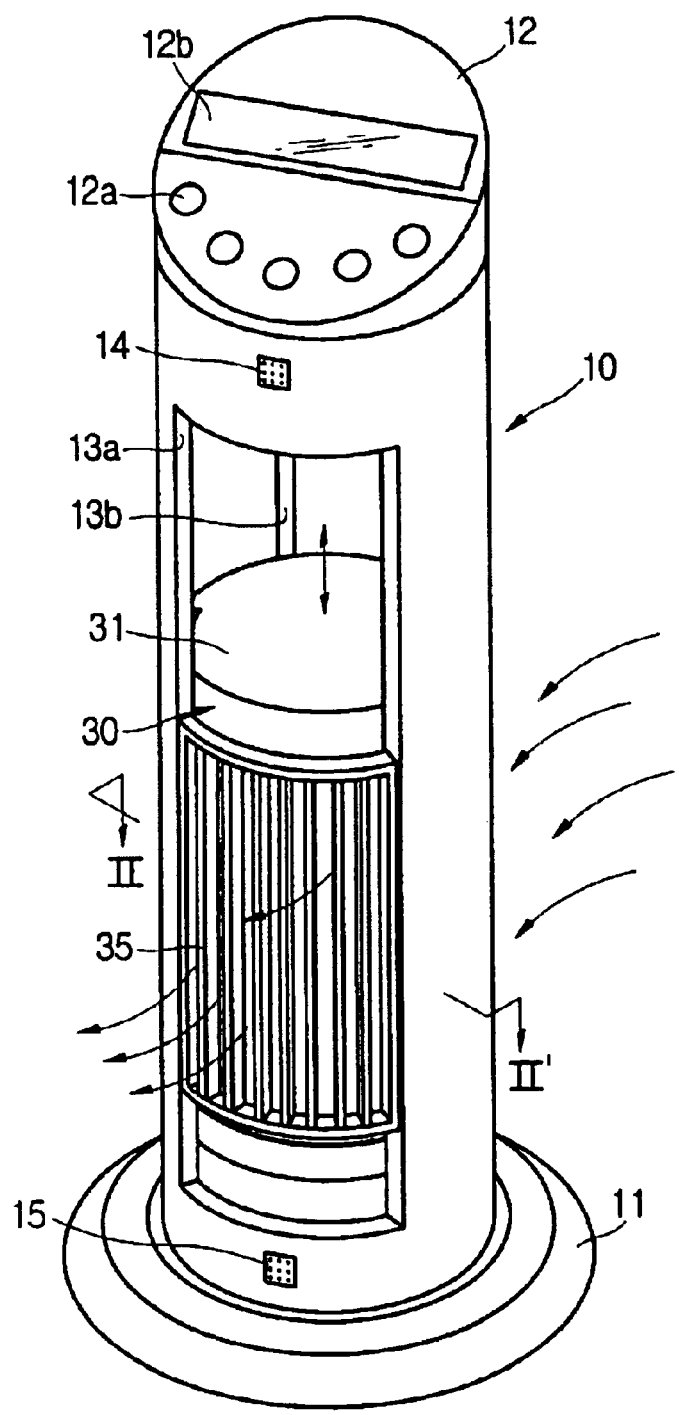
FIG. 1 is a perspective view illustrating an air cleaning apparatus, according to an embodiment the present invention.

Reference will now be made in detail to the present preferred embodiments of the present invention, examples of which are illustrated in the accompanying drawings, wherein like reference numerals refer to like elements throughout.

Figure 4:
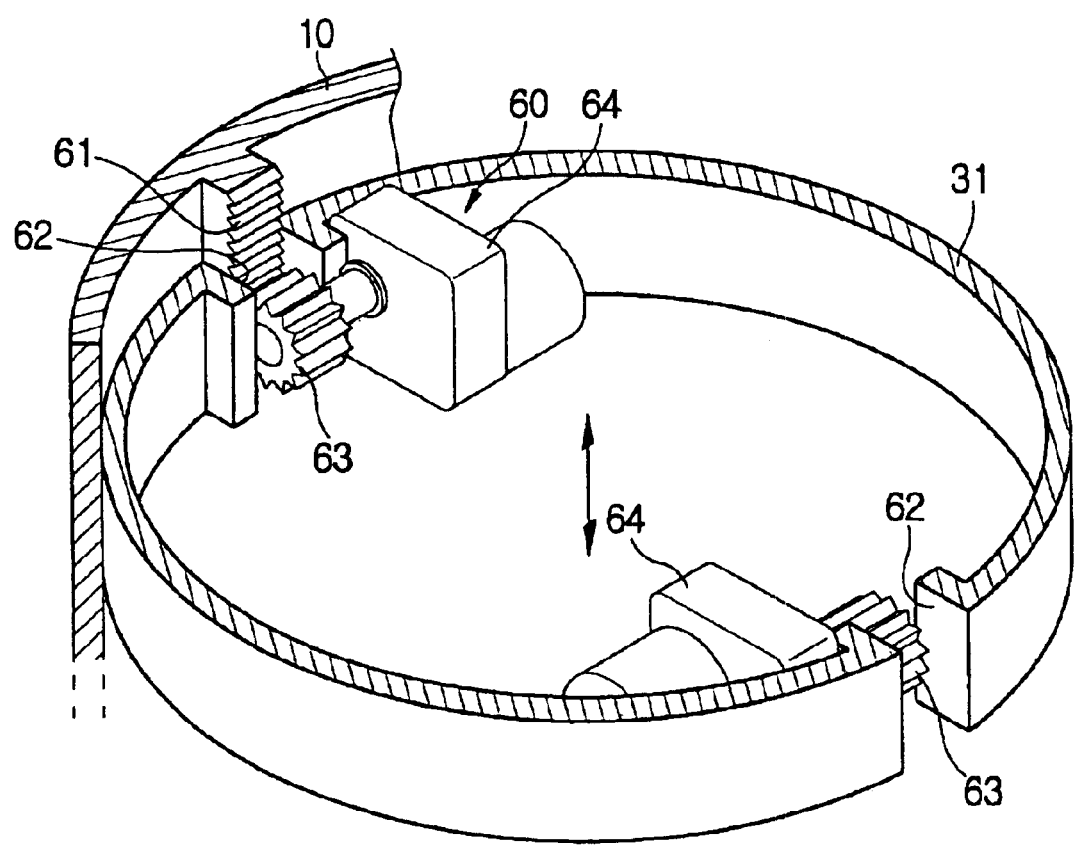
FIG. 4 is a perspective view illustrating an elevating unit included in the air cleaning apparatus of FIG. 1.

As illustrated in FIG. 1, an air cleaning apparatus according to the present invention includes a longitudinal cabinet 10 which stands on a support surface. The longitudinal cabinet has a hollow cylindrical shape. An air cleaning unit 30 is provided in the cabinet 10, and is moved in a vertical direction in the cabinet 10 to clean room air. As illustrated in FIG. 4, an elevating unit 60 is provided between the cabinet 10 and the air cleaning unit 30 to move the air cleaning unit 30 in the vertical direction.

Figure 2:
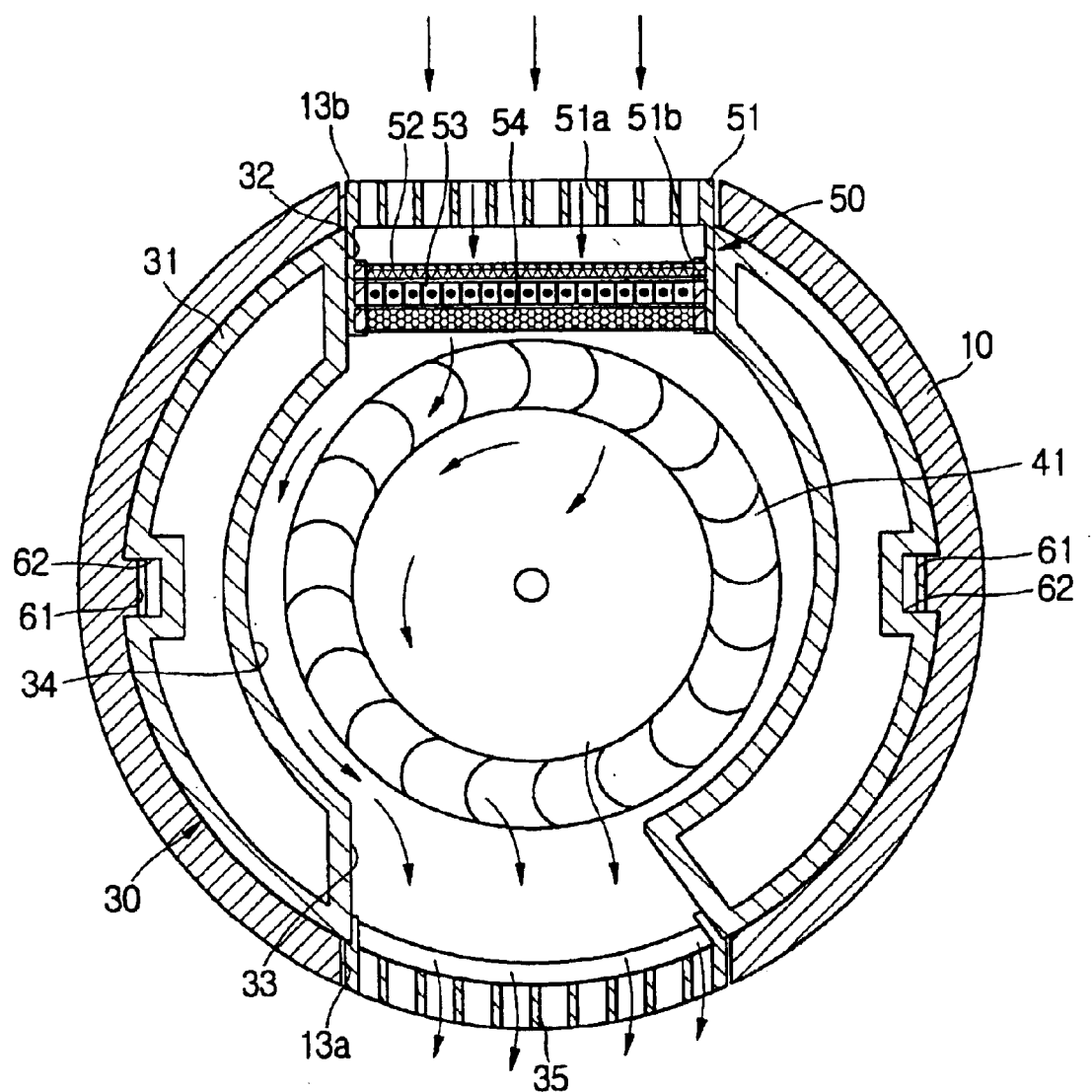
FIG. 2 is a sectional view taken along the line II–II' of FIG. 1.
Figure 5:
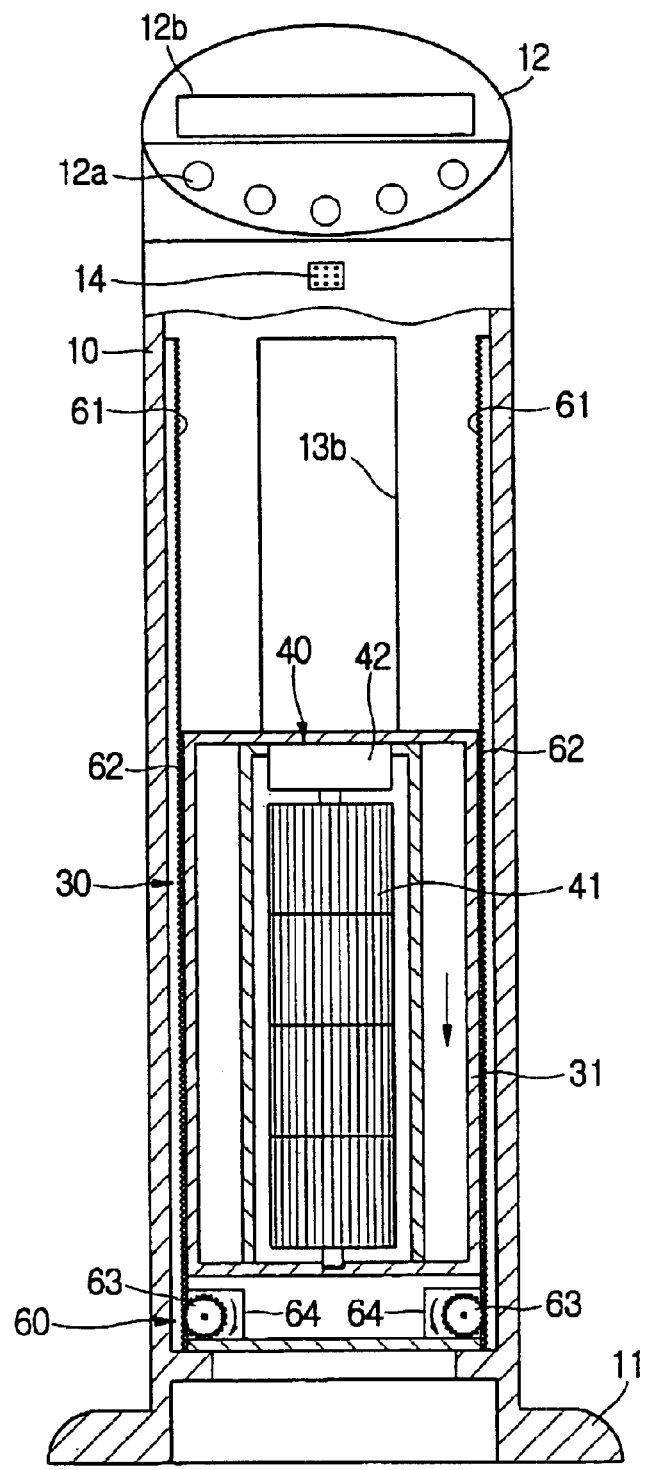
FIG. 5 is a sectional view illustrating the air cleaning apparatus of FIG. 1 when the air cleaning unit moves downwards.

As illustrated in FIGS. 1, 2 and 5, a disc-shaped support base 11 is provided on a bottom of the cabinet 10 to support the cabinet 10. The support base 11 has an outer diameter larger than that of the cabinet 10. A control panel 12 is mounted on a top of the cabinet 10, and is provided with a plurality of control buttons 12a to control an operation of the air cleaning apparatus and a display 12b to display an operating state of the air cleaning apparatus. Although not shown in the drawings, a control unit including a circuit board and a power supply unit is provided inside the control panel 12. Further, vertical openings 13a and 13b, each having a predetermined width, are provided on front and rear portions of the cabinet 10 to circulate air in the air cleaning unit 30 which is installed in the cabinet 10.

As illustrated in FIG. 1, an upper sensor 14 is mounted to an upper portion of the cabinet 10 to sense an air pollution level of an upper part of a room. A lower sensor 15 is mounted to a lower portion of the cabinet 10 to sense an air pollution level of a lower part of the room. The upper and lower sensors 14 and 15 sense the air pollution levels of upper and lower parts of a room, respectively, and inform a user as to which part of the room has a higher air pollution level. According to data obtained from the upper and lower sensors 14 and 15, the air cleaning unit 30 is moved upward or downward to preferentially clean air of the part of the room which has the higher air pollution level.

Figure 3:
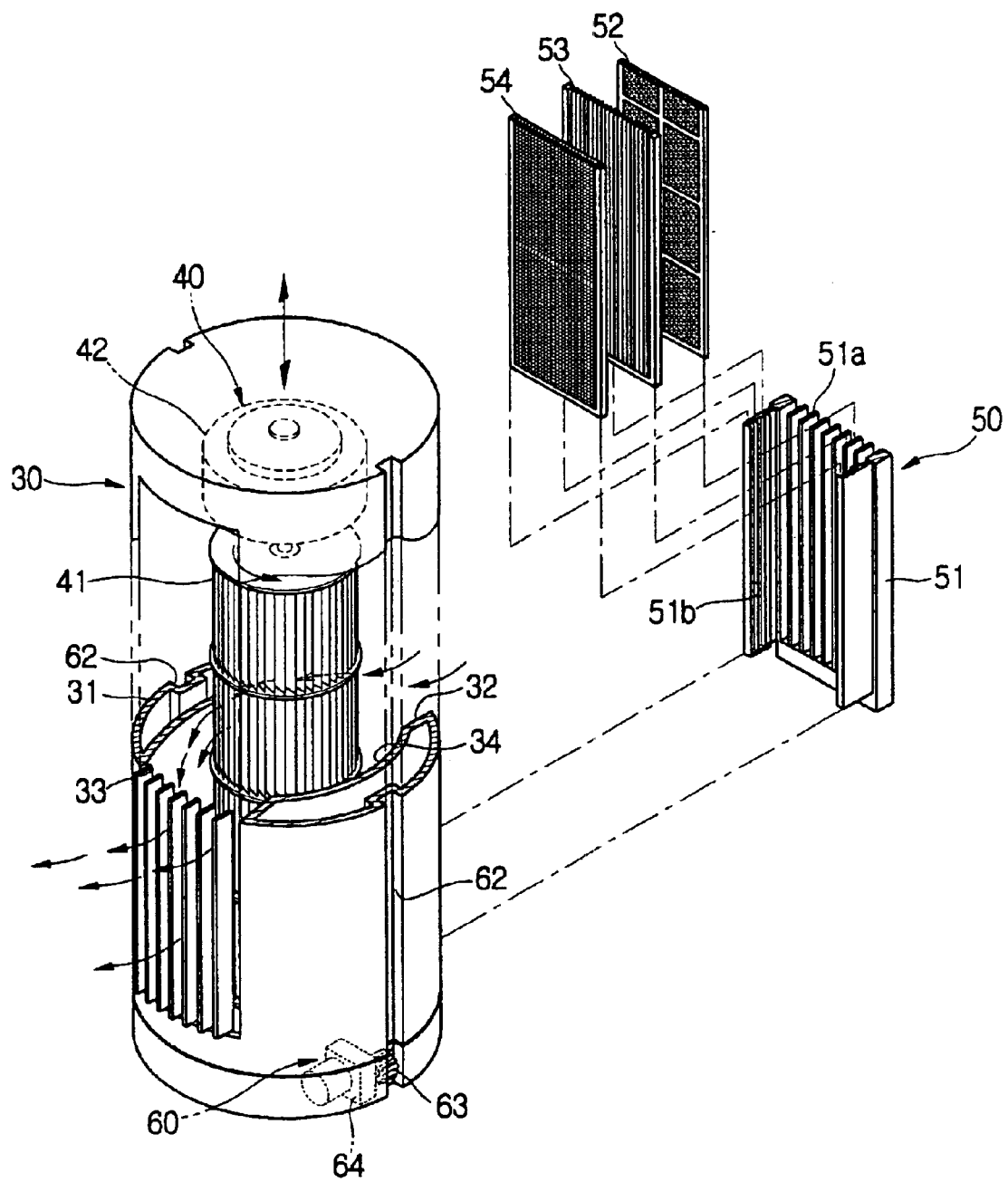
FIG. 3 is an exploded perspective view of an air cleaning unit included in the air cleaning apparatus of FIG. 1.

As illustrated in FIGS. 2 and 3, the air cleaning unit 30 includes a casing 31. The casing 31 has a cylindrical shape which has an outer diameter to correspond to an inner diameter of the cabinet 10 so that the air cleaning unit 30 moves in the cabinet 10 in the vertical direction. An air inlet port 32 and an air outlet port 33 are provided on the front and rear portions of the casing 10 at positions to correspond to the vertical openings 13a and 13b which are provided at front and rear portions of the cabinet 10, respectively. The air inlet port 32 communicates with the air outlet port 33 through a fan mounting space 34. Further, the air cleaning unit 30 is provided with a blowing unit 40, and a filtering unit 50. The blowing unit 40 is installed in the casing 31 to circulate the room air. The filtering unit 50 is mounted to the air inlet port 32 of the casing 31 to clean the room air circulated by the blowing unit 40. An air discharging grill 35 is mounted to the air outlet port 33 of the casing 31 to guide a discharging direction of the air.

The blowing unit 40 includes a cross-flow blowing fan 41, and a fan motor 42. The cross-flow blowing fan 41 is longitudinally and rotatably installed in the fan mounting space 34 of the casing 31. The fan motor 42 is provided at an upper position in the casing 31 to drive the blowing fan 41. In the embodiment shown in the drawings, the fan motor 42 is provided at the upper position in the casing 31. Alternatively, the fan motor 42 may be provided at a lower position in the casing 31.

The filtering unit 50 includes a filter casing 51, and a plurality of filters 52, 53, and 54. The filter casing 51 has a size to correspond to the air inlet port 32 of the casing 31 to be removably mounted to the air inlet port 32, and is provided with an air sucking grill 51a. The filters 52, 53, and 54 are removably installed in the filter casing 51. In this case, filter support walls 51b are provided at both sides of the filter casing 51 to support the filters 52, 53, and 54 in such a way that they are superposed. The filters 52, 53, and 54 include an antibacterial free filter 52, an electrostatic dust filter 53, and a fine dust filter 54 which are sequentially arranged to be supported by the filter support walls 51b. In this case, the antibacterial free filter 52 has a net structure with large meshes to filter relatively large dust particles. The electrostatic dust filter 53 includes a plurality of ground electrodes and discharging lines which are arranged in parallel to each other to collect dust by ionization of dust particles. The fine dust filter 54 is made of polypropylene resin or polyethylene resin to have a shape of a non-woven fabric, and functions to collect fine dust.

The filtering unit 50 having such a construction as described above allows the air to be cleaned while passing through the filters 52, 53, and 54, when the room air is circulated by the operation of the blowing fan 41. Further, when the user desires to remove the filtering unit 50 from the air cleaning unit 30 so as to clean the filtering unit 50 or replace the filters 52, 53, and 54, the user has only to pull the filter casing 51 out from the air cleaning unit 30, thus allowing the filters 52, 53, and 54 to be easily cleaned or replaced with new filters.

As illustrated in FIGS. 2 through 5, the elevating unit 60, which functions to move the air cleaning unit 30 in the vertical direction, includes two racks 61 and two guide channels 62. The racks 61 are longitudinally provided on inner surfaces at both sides of the cabinet 10. The guide channels 62 are longitudinally provided on outer surfaces at both sides of the casing 31 to receive the racks 61 so that the air cleaning unit 30 is moved in the vertical direction by the racks 61. Such a construction of the elevating unit 60 allows the air cleaning unit 30 to be smoothly moved in the vertical direction.

As illustrated in FIG. 4, the elevating unit 60 also includes two pinions 63 and two motors 64. The pinions 63 are rotatably provided in the guide channels 62 of the casing 31 to engage with the racks 61. The motors 64 are provided at the casing 31 to rotate the pinions 63 clockwise or counterclockwise. In this case, a rotating speed of the motors 64 may be reduced by a reduction gear which is provided in the motors 64.

The operation of the air cleaning apparatus will be described below.

Figure 6:
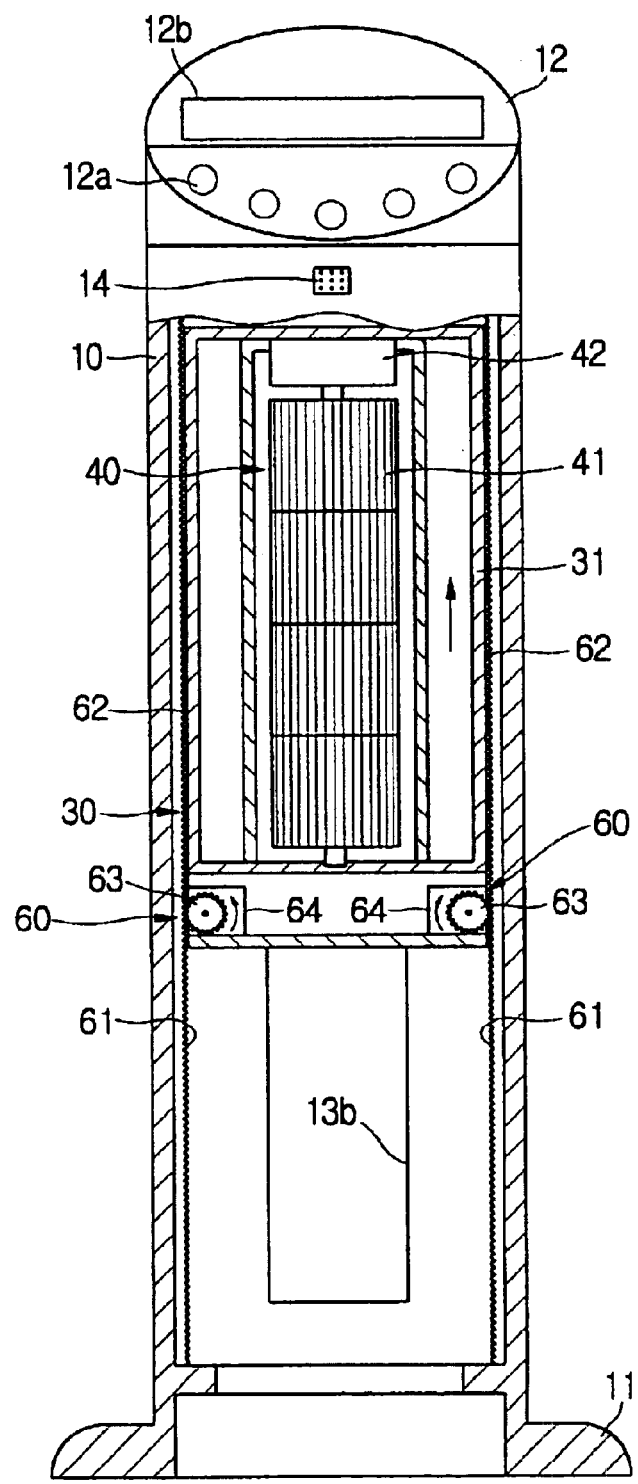
FIG. 6 is a sectional view illustrating the air cleaning apparatus of FIG. 1 when the air cleaning unit moves upwards.

First, when the air cleaning apparatus is operated using the control panel 12 provided on the top of the cabinet 10, air pollution levels are sensed by the upper and lower sensors 14 and 15 which are mounted to the upper and lower portions of the cabinet 10, respectively. The control unit compares the air pollution level of the upper part of a room with that of the lower part of the room, based on data obtained from the upper and lower sensors 14 and 15. When it is determined that the air pollution level of the lower part is higher than that of the upper part, the motors 64 of the elevating unit 60 are operated to move the air cleaning unit 30 downward, as illustrated in FIG. 5. When the air cleaning unit 30 moves downward, the blowing unit 40 is operated to purify the air of the lower part of the room. On the contrary, when it is determined that the air pollution level of the upper part is higher than that of the lower part, the motors 64 are operated to move the air cleaning unit 30 upward, as illustrated in FIG. 6. When the air cleaning unit 30 moves upward, the blowing unit 40 is operated to purify the air of the upper part in the room.

When the pinions 63 engaging with the racks 61 are rotated clockwise or counterclockwise by the motors 64, the casing 31 is moved upward or downward so that the air cleaning unit 30 is moved in the vertical direction. In this case, the guide channels 62 provided on the both sides of the casing 31 are moved upward or downward along the racks 61 which are provided at the inner surfaces of the both sides of the cabinet 10, thus allowing the casing 31 to be smoothly moved in the vertical direction.

An air cleaning process of the air cleaning apparatus according to the present invention will be described as follows.

The air cleaning unit 30 is moved upward or downward, according to the air pollution levels sensed by the upper and lower sensors 14 and 15. Next, the blowing unit 40 is operated to circulate the room air. In this case, when the cross-flow blowing fan 41 of the blowing unit 40 is rotated by the fan motor 42, the room air is sucked through the air inlet port 32 which is provided at the rear portion of the air cleaning unit 30. The sucked air passes through the filtering unit 50 to be cleaned. Thereafter, the clean air is discharged through the air outlet port 33 which is provided at the front portion of the air cleaning unit 30.

As apparent from the above description, the present invention provides an air cleaning apparatus, which is designed such that air pollution levels of upper and lower parts of a room are sensed by upper and lower sensors, respectively. Further, an air cleaning unit is moved in a vertical direction to preferentially clean a part of the air cleaning apparatus having a higher air pollution level, based on data obtained from the sensors, thus allowing a room to be effectively and uniformly cleaned in a short period of time.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An air cleaning apparatus, comprising:
    a longitudinal cabinet to stand on a support surface, and having a hollow cylindrical shape;
    an air cleaning unit installed in the cabinet to move in a vertical direction, and provided with a blowing unit and a filtering unit to clean air; and
    an elevating unit provided at at least one of the cabinet and the air cleaning unit to move the air cleaning unit in the vertical direction.

2. The air cleaning apparatus according to claim 1, further comprising:
    upper and lower sensors which are provided on upper and lower portions of the cabinet, respectively, to sense air pollution levels of upper and lower parts of a room.

3. The air cleaning apparatus according to claim 2, further comprising:
    a control unit to control the air cleaning unit so that the air cleaning unit moves upward or downward, according to data obtained from the upper and lower sensors.

4. The air cleaning apparatus according to claim 1, wherein said elevating unit comprises:
    a rack longitudinally provided at a predetermined portion of the cabinet;
    a pinion to engage with the rack; and
    a motor provided at the air cleaning unit to rotate the pinion clockwise or counterclockwise.

5. The air cleaning apparatus according to claim 1, wherein said cabinet has a cylindrical shape with vertical openings being provided at opposite sides of the cabinet to circulate room air, and
    said air cleaning unit comprises:
        a casing having a cylindrical shape and an outer diameter to correspond to an inner diameter of the cabinet so that the air cleaning unit moves in the cabinet in the vertical direction; and
        an air inlet port and an air outlet port provided on the casing at positions to correspond to the vertical openings so that the air inlet port communicates with the air outlet port, said blowing unit and filtering unit being installed in the casing.

6. The air cleaning apparatus according to claim 5, wherein said blowing unit comprises:
    a cross-flow blowing fan longitudinally installed in the casing of the air cleaning unit; and
    a fan motor installed in the casing to rotate the blowing fan.

7. The air cleaning apparatus according to claim 5, wherein said filtering unit comprises:
    a filter casing removably mounted to the air inlet port of the casing; and
    at least one filter installed in the filter casing.

8. The air cleaning apparatus according to claim 7, wherein said filter, installed in the filter casing, comprises:
    an antibacterial free filter, an electrostatic dust filter, and a fine dust filter which are arranged to be superposed.

9. The air cleaning apparatus according to claim 5, wherein said elevating unit comprises:
    a rack longitudinally provided at an inner surface of the cabinet;
    a guide channel longitudinally provided at an outer surface of the casing to receive the rack, guiding an elevating movement of the casing;
    a pinion to engage with the rack, and rotatably supported by the casing; and
    a motor provided at the casing to rotate the pinion clockwise or counterclockwise.

10. The air cleaning apparatus according to claim 5, further comprising:
    a control panel mounted to a top of the cabinet, and provided with a plurality of control buttons to control an operation of the air cleaning apparatus and a display to display an operating state of the air cleaning apparatus.

11. The air cleaning apparatus according to claim 1, further comprising:
    a disc-shaped support base provided on a bottom of the cabinet to support the cabinet, and having an outer diameter larger than an outer diameter of the cabinet.

12. The air cleaning apparatus according to claim 5, further comprising:

an air discharging grill mounted to the air outlet port of the casing to guide a discharging direction of the air.

13. The air cleaning apparatus according to claim 7, wherein a size of the filter casing corresponds to the air inlet port of the casing.

14. The air cleaning apparatus according to claim 7, wherein the filter casing comprises an air sucking grill to suck in the room air.

15. The air cleaning apparatus according to claim 8, wherein the filter casing comprises:

filter support walls provided at opposite sides of the filter casing to support the antibacterial free filter, the electrostatic dust filter, and the fine dust filter.

16. An air cleaning apparatus, comprising:

a longitudinal cabinet to stand on a support surface;

an air cleaning unit installed in the cabinet to move in a vertical direction;

an elevating unit provided at at least one of the cabinet and the air cleaning unit to move the air cleaning unit in the vertical direction;

a plurality of sensors provided in the cabinet to sense room air pollution levels; and a control unit to control the air cleaning unit to move in the vertical direction based on data obtained from the sensors.

* * * * *